(12) United States Patent
Ma et al.

(10) Patent No.: US 12,229,363 B2
(45) Date of Patent: Feb. 18, 2025

(54) DISPLAY APPARATUS, DISPLAY METHOD, AND COMPUTER-PROGRAM PRODUCT

(71) Applicant: BOE Technology Group Co., Ltd., Beijing (CN)

(72) Inventors: Xitong Ma, Beijing (CN); Xingxing Zhao, Beijing (CN); Tao Li, Beijing (CN); Ran Duan, Beijing (CN); Yangyang Zhang, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/257,348

(22) PCT Filed: Sep. 28, 2022

(86) PCT No.: PCT/CN2022/122016
§ 371 (c)(1),
(2) Date: Jun. 14, 2023

(87) PCT Pub. No.: WO2024/065252
PCT Pub. Date: Apr. 4, 2024

(65) Prior Publication Data
US 2024/0370113 A1 Nov. 7, 2024

(51) Int. Cl.
G06F 3/14 (2006.01)
G06F 3/041 (2006.01)
(Continued)

(52) U.S. Cl.
CPC ........ G06F 3/0416 (2013.01); G06F 3/04883 (2013.01); G09G 3/342 (2013.01);
(Continued)

(58) Field of Classification Search
CPC .. G06F 3/0416; G06F 3/04883; G06F 3/1407; G09G 3/342; G09G 2320/0252;
(Continued)

(56) References Cited

U.S. PATENT DOCUMENTS

2013/0207937 A1 8/2013 Lutian et al.
2016/0077782 A1* 3/2016 Choi ............... G06F 3/1407
345/173
(Continued)

FOREIGN PATENT DOCUMENTS

CN 102495698 A 6/2012
CN 102880356 A 1/2013
(Continued)

OTHER PUBLICATIONS

International Search Report & Written Opinion mailed May 19, 2023, regarding PCT/CN2022/122016.
(Continued)

Primary Examiner — Abdul-Samad A Adediran
(74) Attorney, Agent, or Firm — Intellectual Valley Law, P.C.

(57) ABSTRACT

A display apparatus is provided. The display apparatus includes a touch device configured to detect a touch; a first processor configured to receive data of first touch trajectory sequence information when a touch occurs, the first touch trajectory sequence information comprising information of at least one first touch trajectory point; and generate a first image data comprising data of a first touch trajectory image, wherein the data of the first touch trajectory image is generated based on the first touch trajectory sequence information; and a second processor configured to receive data of second touch trajectory sequence information when the touch occurs, the second touch trajectory sequence information comprising information of at least one second touch trajectory point; receive the first image data from the first processor; and generate a third image data based on the first image data and at least a portion of the second touch trajectory sequence information.

20 Claims, 9 Drawing Sheets

(51) Int. Cl.
*G06F 3/04883* (2022.01)
*G09G 3/34* (2006.01)

(52) U.S. Cl.
CPC .............. *G09G 2320/0252* (2013.01); *G09G 2320/066* (2013.01); *G09G 2330/021* (2013.01); *G09G 2354/00* (2013.01)

(58) Field of Classification Search
CPC ....... G09G 2320/066; G09G 2330/021; G09G 2354/00
USPC ......................................................... 345/173
See application file for complete search history.

(56) References Cited

U.S. PATENT DOCUMENTS

| | | |
|---|---|---|
| 2016/0092021 A1 | 3/2016 | Tu et al. |
| 2019/0073808 A1 | 3/2019 | Kagawa |
| 2019/0295212 A1 | 9/2019 | Patterson et al. |
| 2021/0026587 A1 | 1/2021 | Christiansson et al. |
| 2022/0019782 A1 | 1/2022 | Oshima et al. |
| 2022/0121307 A1 | 4/2022 | Liu |
| 2022/0206655 A1 | 6/2022 | Wang et al. |

FOREIGN PATENT DOCUMENTS

| | | |
|---|---|---|
| CN | 107003993 A | 8/2017 |
| CN | 109885271 A | 6/2019 |
| CN | 109933276 A | 6/2019 |
| CN | 111459337 A | 7/2020 |
| CN | 111831160 A | 10/2020 |
| CN | 111868681 A | 10/2020 |
| CN | 112306359 A | 2/2021 |
| CN | 113050839 A | 6/2021 |
| CN | 113311984 A | 8/2021 |
| CN | 114008570 A | 2/2022 |
| CN | 114041111 A | 2/2022 |
| CN | 114356201 A | 4/2022 |
| CN | 114442845 A | 5/2022 |
| CN | 114510159 A | 5/2022 |
| JP | 2019219965 A | 12/2019 |

OTHER PUBLICATIONS

Groufsky, M. "An Embedded Augmented Reality System", Electrical and Computer Engineering at the University of Canterbury, Christchurch, New Zealand, Feb. 10, 2011, p. 1-71 English Translation of Abstract attached.

He, H. "SOC Prototype Design for Infrared Camera Electronic Whiteboard", Master Dissertation, University of Electronic Science and Technology of China, May 2012, p. 35-57, English Translation of Abstract attached.

Li et al., "Design of an Image Whiteboard Controller Based on DSP+FPGA", China New Technologies and Products, No. 10 2013, p. 3-4, English Translation of Abstract attached.

* cited by examiner generating, by the second processor, a second image data of a second touch trajectory image based on the second touch trajectory sequence information

generating, by the second processor, the third image data based on the first image data and the second image data

FIG. 6B modifying, by the second processor, the first image data based on the at least a portion of the second touch trajectory sequence information, thereby generating the third image data

FIG. 6C generating, by the second processor, the second image data of the second touch trajectory image based on information of the M number of touch trajectory points and the trajectory parameters in the first touch trajectory sequence information

generating the third image data based on the second image data of the second touch trajectory image and the first image data comprising the data of the first touch trajectory image

FIG. 8

DISPLAY APPARATUS, DISPLAY METHOD, AND COMPUTER-PROGRAM PRODUCT

CROSS-REFERENCE TO RELATED APPLICATION

This application is a national stage application under 35 U.S.C. § 371 of International Application No. PCT/CN2022/122016, filed Sep. 28, 2022, the contents of which are incorporated by reference in the entirety.

TECHNICAL FIELD

The present invention relates to display technology, more particularly, to a display apparatus, a display method, and a computer-program product.

BACKGROUND

A display apparatus typically includes a display panel for displaying an image. Sometimes the display apparatus also includes a touch device such as a touch control layer on the display panel. The touch device allows a user to input information by touch writing.

SUMMARY

In one aspect, the present disclosure provides a display apparatus, comprising a touch device configured to detect a touch; a first processor configured to receive data of first touch trajectory sequence information when a touch occurs, the first touch trajectory sequence information comprising information of at least one first touch trajectory point; and generate a first image data comprising data of a first touch trajectory image, wherein the data of the first touch trajectory image is generated based on the first touch trajectory sequence information; and a second processor configured to receive data of second touch trajectory sequence information when the touch occurs, the second touch trajectory sequence information comprising information of at least one second touch trajectory point; receive the first image data from the first processor; and generate a third image data based on the first image data and at least a portion of the second touch trajectory sequence information.

Optionally, the second processor is further configured to generate a second image data of a second touch trajectory image based on the second touch trajectory sequence information; and generate the third image data based on the first image data and the second image data.

Optionally, a respective frame of image in the first image data corresponds to a respective frame of image in the second image data; and at least a portion of second touch trajectory points for forming the respective frame of image in the second image data are obtained by the touch device later in time than first touch trajectory points for forming the respective frame of image in the first image data.

Optionally, the first processor is coupled to the touch device, and is further configured to determine whether the touch occurs, and transmit a result of determination to the second processor when the touch occurs; and the second processor is configured to generate the third image data when the touch occurs.

Optionally, the first processor further configured to transmit at least trajectory parameters in the data of the first touch trajectory image to the second processor; and the second processor is configured to generate the second image data of the second touch trajectory image based on the trajectory parameters.

Optionally, the trajectory parameters include at least one of a color, a line width, or a writing style.

Optionally, the second processor is further configured to receive information of at least M number of touch trajectory points, the second touch trajectory sequence information comprising information of the M number of touch trajectory points; and the second processor is configured to generate the second image data of the second touch trajectory image based on information of the M number of touch trajectory points.

Optionally, M number of touch trajectory points are latched at least partially in an ineffective period between effective periods of a respective frame of image and a next adjacent frame of image, the second touch trajectory sequence information comprising information of the M number of touch trajectory points; and the second processor is configured to receive the first image data during the effective periods; the second processor is configured to generate the second image data of the second touch trajectory image based on information of the M number of touch trajectory points.

Optionally, the second processor is further configured to generate a plurality of data enabling signals and a plurality of latching signals; an effective voltage level of a respective data enabling signal of the plurality of data enabling signals indicates the second processor is receiving touch trajectory points row-by-row from the touch device; a respective latching signal of the plurality of latching signals is generated during the ineffective period and subsequent to a beginning time point of an ineffective voltage level of the respective data enabling signal by an interval; and the second processor is configured to latch information of the M number of touch trajectory points upon generation of the respective latching signal.

Optionally, the display apparatus further comprises a display panel having a resolution different from a resolution of the touch device; wherein the second processor is further configured to convert coordinate information in a first coordinate system in the touch device into coordinate information in a second coordinate system in the display panel; and generate the third image data according to coordinate information in a second coordinate system in the display panel.

Optionally, the display apparatus further comprises a display panel and a back light unit; wherein the back light unit comprises a plurality of independently controllable back light portions; the second processor is further configured to, based on the third image data, generate a plurality of back light portion driving parameters for the plurality of independently controllable back light portions, respectively, wherein a respective driving parameter of the plurality of back light portion driving parameters is used for drive light emission of a respective back light portion of the plurality of independently controllable back light portions; perform pixel compensation on the third image data based on the plurality of back light portion driving parameters to generate a compensated image data; and transmit the compensated image data to the display panel; wherein the display panel is configured to display an image based on the compensated image data.

Optionally, the second processor is coupled to the touch device.

Optionally, the second processor is coupled to the first processor; and the first processor is configured to receive the data of first touch trajectory sequence information when a touch occurs from the touch device, and is configured to transmit the data of second touch trajectory sequence information to the second processor.

Optionally, the first processor is a solution-on-chip, and the second processor is a field-programmable gate array.

In another aspect, the present disclosure provides a display method, comprising detecting a touch by a touch device; receiving, by a first processor, data of first touch trajectory sequence information when a touch occurs, the first touch trajectory sequence information comprising information of at least one first touch trajectory point; generating, by the first processor, a first image data comprising data of a first touch trajectory image, wherein the data of the first touch trajectory image is generated based on the first touch trajectory sequence information; receiving, by a second processor, data of second touch trajectory sequence information when the touch occurs, the second touch trajectory sequence information comprising information of at least one second touch trajectory point; receiving, by the second processor, the first image data from the first processor; and generating, by the second processor, a third image data based on the first image data and at least a portion of the second touch trajectory sequence information.

Optionally, the display method further comprises generating, by the second processor, a second image data of a second touch trajectory image based on the second touch trajectory sequence information; and generating, by the second processor, the third image data based on the first image data and the second image data.

Optionally, a respective frame of image in the first image data corresponds to a respective frame of image in the second image data; and at least a portion of second touch trajectory points for forming the respective frame of image in the second image data are obtained by the touch device later in time than first touch trajectory points for forming the respective frame of image in the first image data.

Optionally, the display method further comprises determining, by the first processor, whether the touch occurs; transmitting, by the first processor, a result of determination to the second processor when the touch occurs; and generating, by the second processor, the third image data when the touch occurs.

Optionally, the display method further comprises transmitting, by the first processor, at least trajectory parameters in the data of the first touch trajectory image to the second processor; and generating, by the second processor, the second image data of the second touch trajectory image based on the trajectory parameters.

Optionally, the trajectory parameters include at least one of a color, a line width, or a writing style.

Optionally, the display method further comprises receiving, by the second processor, information of at least M number of touch trajectory points; and generating, by the second processor, the second image data of the second touch trajectory image based on information of the M number of touch trajectory points.

Optionally, M number of touch trajectory points are latched at least partially in an ineffective period between effective periods of a respective frame of image and a next adjacent frame of image, the second touch trajectory sequence information comprising information of the M number of touch trajectory points; and wherein the display method further comprises receiving, by the second processor, the first image data during the effective periods; and generating, by the second processor, the second image data of the second touch trajectory image based on information of the M number of touch trajectory points.

Optionally, the display method further comprises generating, by the second processor, a plurality of data enabling signals and a plurality of latching signals; wherein an effective voltage level of a respective data enabling signal of the plurality of data enabling signals indicates the second processor is receiving touch trajectory points row-by-row from the touch device; a respective latching signal of the plurality of latching signals is generated during the ineffective period and subsequent to a beginning time point of an ineffective voltage level of the respective data enabling signal by an interval; and the display method further comprises latching, by the second processor, information of the M number of touch trajectory points upon generation of the respective latching signal.

Optionally, the display method further comprises converting, by the second processor, coordinate information in a first coordinate system in the touch device into coordinate information in a second coordinate system in a display panel; and generating, by the second processor, the third image data according to the second coordinate system; wherein the display panel has a resolution different from a resolution of the touch device.

Optionally, the second processor is coupled to a back light unit and a display panel; and the back light unit comprises a plurality of independently controllable back light portions; wherein the display method further comprises, based on the third image data, generating, by the second processor, a plurality of back light portion driving parameters for the plurality of independently controllable back light portions, respectively, wherein a respective driving parameter of the plurality of back light portion driving parameters is used for drive light emission of a respective back light portion of the plurality of independently controllable back light portions; performing, by the second processor, pixel compensation on the third image data based on the plurality of back light portion driving parameters to generate a compensated image data; transmitting, by the second processor, the compensated image data to the display panel; and displaying, by the display panel, an image based on the compensated image data.

Optionally, the second processor is coupled to the touch device.

Optionally, the second processor is coupled to the first processor; the display method further comprises receiving, by the first processor, the data of first touch trajectory sequence information when a touch occurs from the touch device; and transmitting, by the first processor, the data of second touch trajectory sequence information to the second processor.

Optionally, the first processor is a solution-on-chip, and the second processor is a field-programmable gate array.

In another aspect, the present disclosure provides a computer-program product comprising a non-transitory tangible computer-readable medium having computer-readable instructions thereon, the computer-readable instructions being executable by a processor to cause the processor to perform causing a first processor to receive data of first touch trajectory sequence information when a touch occurs, the first touch trajectory sequence information comprising information of at least one first touch trajectory point; causing the first processor to generate a first image data comprising data of a first touch trajectory image, wherein the data of the first touch trajectory image is generated based on the first touch trajectory sequence information; causing a second processor to receive data of second touch trajectory sequence information when the touch occurs, the second touch trajectory sequence information comprising information of at least one second touch trajectory point; causing the second processor to receive the first image data from the first processor; and causing the second processor to generate a third image data based on the first image data and at least a portion of the second touch trajectory sequence information.

BRIEF DESCRIPTION OF THE FIGURES

The following drawings are merely examples for illustrative purposes according to various disclosed embodiments and are not intended to limit the scope of the present invention.

FIG. 6B is a flow chart illustrating a display method in some embodiments according to the present disclosure.

FIG. 6C is a flow chart illustrating a display method in some embodiments according to the present disclosure.

FIG. 8 is a flow chart illustrating a display method in some embodiments according to the present disclosure.

DETAILED DESCRIPTION

Figure 1:
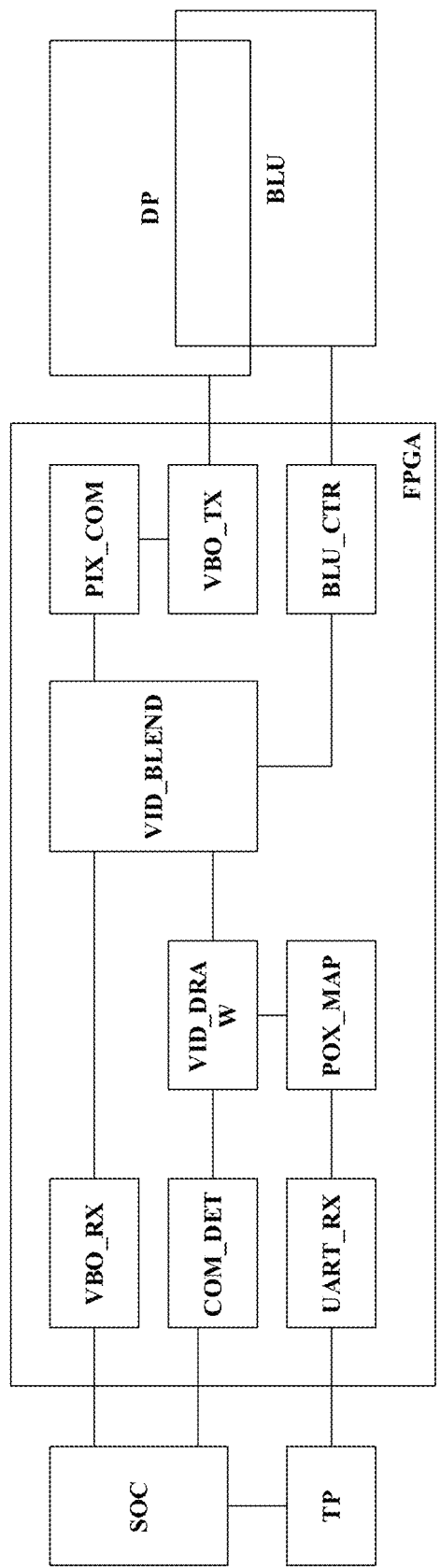
FIG. 1 is a schematic diagram illustrating the structure of a display apparatus in some embodiments according to the present disclosure.

The disclosure will now be described more specifically with reference to the following embodiments. It is to be noted that the following descriptions of some embodiments are presented herein for purpose of illustration and description only. It is not intended to be exhaustive or to be limited to the precise form disclosed.

Related display apparatus typically includes a display panel for displaying an image and a touch panel for receiving user input. The display panel in the related display apparatus can display a user's writing on the touch panel in real time. However, the user's writing oftentimes is displayed with a delay on the display panel, adversely affecting user experience. The user's writing image is generated by solution-on-chip based on touch trajectory points transmitted from the touch panel to the solution-on-chip. Because it takes time to transmit the touch trajectory points and rendering the writing image, the delay is at least partially due to the transmission of the touch trajectory points and rendering of the writing image by the solution-on-chip.

Accordingly, the present disclosure provides, inter alia, a display apparatus, a display method, and a computer-program product that substantially obviate one or more of the problems due to limitations and disadvantages of the related art. In one aspect, the present disclosure provides a display apparatus. In some embodiments, the display apparatus includes a touch device configured to detect a touch; a first processor configured to receive data of first touch trajectory sequence information when a touch occurs, the first touch trajectory sequence information comprising information of at least one first touch trajectory point; and generate a first image data comprising data of a first touch trajectory image, wherein the data of the first touch trajectory image is generated based on the first touch trajectory sequence information; and a second processor configured to receive data of second touch trajectory sequence information comprising information of at least one second touch trajectory point when the touch occurs; receive the first image data from the first processor; and generate a third image data based on the first image data and at least a portion of the second touch trajectory sequence information. Optionally, the touch refers to a touch writing, e.g., by a finger or a touch pen.

Touch data transmitted from the touch device to the first processor (e.g., a solution-on-chip) typically includes a series of data comprising a plurality of touch trajectory points. A respective touch trajectory point may be expressed as (x, y, t), wherein x and y stand for coordinates of the respective touch trajectory point, and t stands for a time point. In one example, the time point is a real time point. In another example, the time point is a serial number.

In some embodiments, the touch data may further include stroke information. In one example, the touch data further includes stroke information for putting down a pen, wielding a pen, and/or lifting up a pen.

In some embodiments, stroke information may be calculated by the first processor (e.g., the solution-on-chip). Optionally, the first processor is further configured to calculate other parameters such as writing speed.

FIG. 1 is a schematic diagram illustrating the structure of a display apparatus in some embodiments according to the present disclosure. Referring to FIG. 1, the display apparatus in some embodiments includes a touch device TP configured to detect a touch; a first processor (e.g., a solution-on-chip SOC) configured to receive data of first touch trajectory sequence information when a touch occurs, and generate a first image data comprising data of a first touch trajectory image, wherein the data of the first touch trajectory image is generated based on the first touch trajectory sequence information. Optionally, the first touch trajectory sequence information includes information of at least one first touch trajectory point, e.g., N number of first touch trajectory points based on N number of touch positions detected by the touch device, N being a positive integer ≥1.

As discussed above, in some embodiments, the data of the first touch trajectory image is generated based on the first touch trajectory sequence information. The first image data in some embodiments further includes data of other images that are not generated based on the first touch trajectory sequence information. In one example, the first image data further includes data of icons (menus or controllers) in a user interface.

In some embodiments, the first processor is configured to receive the first touch trajectory sequence information, and generate the data of the first touch trajectory image based on the first touch trajectory sequence information and trajectory parameters such as a color, a line width, or a writing style in the first touch trajectory image. In one example, a color parameter is used for generating grayscale value, a line width parameter is used for generating positional information, and a writing style parameter is also used for generating positional information. Optionally, the first processor is further configured to generate trajectory smoothing parameters such as trajectory smoothing parameter according to Bezier curve smoothing method. Optionally, the first processor is further configured to generate trajectory parameters related to a method of adjusting line width based on touch pressure and/or touch speed. In one example, trajectory parameters related to the color, the line width, and/or the writing style can be user adjustable. In another example, the trajectory parameters may be adjusted using a controller or a menu in the user interface discussed above.

In some embodiments, the display apparatus further includes a second processor (e.g., a field-programmable gate array FPGA) configured to receive data of second touch trajectory sequence information when the touch occurs, and generate a third image data based on the first image data and at least a portion of the second touch trajectory sequence information. Optionally, the second touch trajectory sequence information includes information of at least one second touch trajectory point, M number of touch trajectory points based on M number of touch positions detected by the touch device, M being a positive integer ≥1, N>M.

Various appropriate implementations may be practiced to generate the third image data. In some embodiments, the second processor is further configured to generate a second image data of a second touch trajectory image based on the second touch trajectory sequence information; receive the first image data from the first processor; and generate the third image data based on the first image data and the second image data.

In some embodiments, generating the third image data includes replacing one or more subpixel image data in the first image data with one or more subpixel image data in the second image data. In one example, a respective second subpixel image data in the second image data includes a coordinate of a first subpixel image data to be replaced in the first image data and a grayscale value, the first subpixel image data to be replaced in the first image data being replaced by the respective second subpixel image data. The coordinate of the respective first subpixel image data is determined at least in part by the second touch trajectory points information.

In some embodiments, the second processor is further configured to determine whether or not a subpixel image data in the first image data is to be replaced by a subpixel image data in the second image data, the subpixel image data in the first image data and the subpixel image data in the second image data comprising the same positional information, e.g., a same coordinate. Optionally, the second processor is further configured to compare grayscale values of the subpixel image data in the first image data and the subpixel image data in the second image data. Optionally, the second processor is configured to determine that the subpixel image data in the first image data is to be replaced by a subpixel image data in the second image data, when a difference between the grayscale values of the subpixel image data in the first image data and the subpixel image data in the second image data is greater than a threshold value (e.g., the difference is greater than at least 5%, at least 10%, at least 15%, or at least 20%, of a grayscale value of the subpixel image data in the first image data).

In one example, the second processor is further configured to determine a plurality of subpixel image data in the first image data (e.g., 1000 subpixel image data) is to be replaced by a plurality of subpixel image data in the second image data. A respective subpixel image data in the plurality of subpixel image data in the first image data has a same positional information (e.g., coordinate) as a respective subpixel image data in the plurality of subpixel image data in the second image data. The second processor is further configured to replace the plurality of subpixel image data in the first image data with the plurality of subpixel image data in the second image data in one batch.

In another example, the second processor is further configured to determine an individual subpixel image data in the first image data is to be replaced by an individual subpixel image data in the second image data. The individual subpixel image data in the first image data has a same positional information (e.g., coordinate) as the individual subpixel image data in the second image data. The second processor is further configured to replace the individual subpixel image data in the first image data with the individual subpixel image data in the second image data. The second processor is further configured to reiterate the above process until all subpixel image data in the first image data that need to be replaced are replaced with corresponding subpixel image data in the second image data.

In some embodiments, the second processor is further configured to receive the first image data from the first processor; and modify the first image data based on the at least a portion of the second touch trajectory sequence information, thereby generating the third image data.

Optionally, the display apparatus further includes a display panel DP configured to display an image.

Optionally, the display apparatus further includes a back light unit BLU configured to provide a back light for the display panel DP.

In some embodiments, the touch device TP includes a touch sensing component and a controller. Examples of touch sensing components include capacitive touch sensing component and infra-red sending component. The controller is configured to control timing of the touch sensing component, and send touch position information to one or more processors such as the solution-on-chip SOC and the field-programmable gate array FPGA. Optionally, the controller is configured to perform sparse sampling on the touch signal prior to sending the touch position information to the one or more processors.

In some embodiments, the solution-on-chip SOC is coupled to the field-programmable gate array FPGA and to the touch device TP. The field-programmable gate array FPGA is coupled to the touch device TP, the solution-on-chip SOC, the display panel DP, and the back light unit BLU. The display panel DP is coupled to the field-programmable gate array FPGA. The back light unit BLU is coupled to the field-programmable gate array FPGA. In one example, the field-programmable gate array FPGA is configured to receive the second touch trajectory sequence information from the touch device TP, and generate the second image data of the second touch trajectory image based on the second touch trajectory sequence information.

In some embodiments, the solution-on-chip SOC is coupled to the field-programmable gate array FPGA and to the touch device TP. The field-programmable gate array FPGA is coupled to the solution-on-chip SOC, the display panel DP, and the back light unit BLU. The display panel DP is coupled to the field-programmable gate array FPGA. The back light unit BLU is coupled to the field-programmable gate array FPGA. In one example, the field-programmable gate array FPGA is configured to receive the second touch trajectory sequence information from the solution-on-chip SOC, and generate the second image data of the second touch trajectory image based on the second touch trajectory sequence information.

In some embodiments, the touch device TP is configured to transmit touch trajectory sequence information to the solution-on-chip SOC and/or the field-programmable gate array FPGA. Optionally, the touch device TP includes a touch control layer disposed on a display panel DP.

In some embodiments, the field-programmable gate array FPGA includes an image receiving module VBO_RX configured to receive image data (e.g., the first image data comprising data of the first touch trajectory image) from the solution-on-chip SOC. In one example, the solution-on-chip SOC is configured to transmit the image data according to a VBO protocol.

In some embodiments, the solution-on-chip SOC is configured to generate the first image data comprising data of the first touch trajectory image based on the first touch trajectory sequence information, and transmit the first image data to the image receiving module VBO_RX of the field-programmable gate array FPGA.

Optionally, the field-programmable gate array FPGA further includes a command detection module COM_DET configured to parse information of at least M number of touch trajectory points. The information of at least M number of touch trajectory points includes information of coordinates and time points of touch trajectory points.

Optionally, the field-programmable gate array FPGA further includes a serial receiver module UART_RX configured to receive and parse information of at least M number of touch trajectory points, e.g., in real time. In one example, the serial receiver module UART_RX is configured to receive information of touch trajectory points from the touch device TP. In another example, the serial receiver module UART_RX is configured to receive information of touch trajectory points from the solution-on-chip SOC.

Optionally, the field-programmable gate array FPGA further includes a position mapping module POX_MAP configured to convert (e.g., map) coordinate information in a first coordinate system in the touch device into coordinate information in a second coordinate system in a display apparatus (e.g., the display panel DP). Optionally, the field-programmable gate array FPGA is configured to generate the third image data according to the second coordinate system.

Optionally, the field-programmable gate array FPGA further includes a touch image generating module VID_DRAW configured to generate touch image data. In one example, the touch image generating module VID_DRAW is configured to generate a second image data of a second touch trajectory image based on the second touch trajectory sequence information.

Optionally, the field-programmable gate array FPGA further includes an image superimposition module VID_BLEDN configured to superimpose at least a portion of a second image data of a second touch trajectory image based on the second touch trajectory sequence information onto a first image data comprising data of a first touch trajectory image, wherein the data of the first touch trajectory image is generated based on the first touch trajectory sequence information, thereby generating a third image data.

Optionally, the field-programmable gate array FPGA further includes a subpixel compensation module PIX_COM configured to perform pixel compensation on the third image data to generate a compensated image data.

Optionally, the field-programmable gate array FPGA further includes an image transmitting module VBO_TX configured to transmit image data (e.g., the compensated image data) to the display panel DP.

The modules described herein may be implemented as electronic hardware, computer software, or combinations of both. Such modules may be implemented or performed with a general purpose processor, a digital signal processor (DSP), an ASIC or ASSP, an FPGA or other programmable logic device, discrete gate or transistor logic, discrete hardware components, or any combination thereof designed to produce the configuration as disclosed herein. For example, such a configuration may be implemented at least in part as a hard-wired circuit, as a circuit configuration fabricated into an application-specific integrated circuit, or as a firmware program loaded into non-volatile storage or a software program loaded from or into a data storage medium as machine-readable code, such code being instructions executable by an array of logic elements such as a general purpose processor or other digital signal processing unit.

Figure 2:
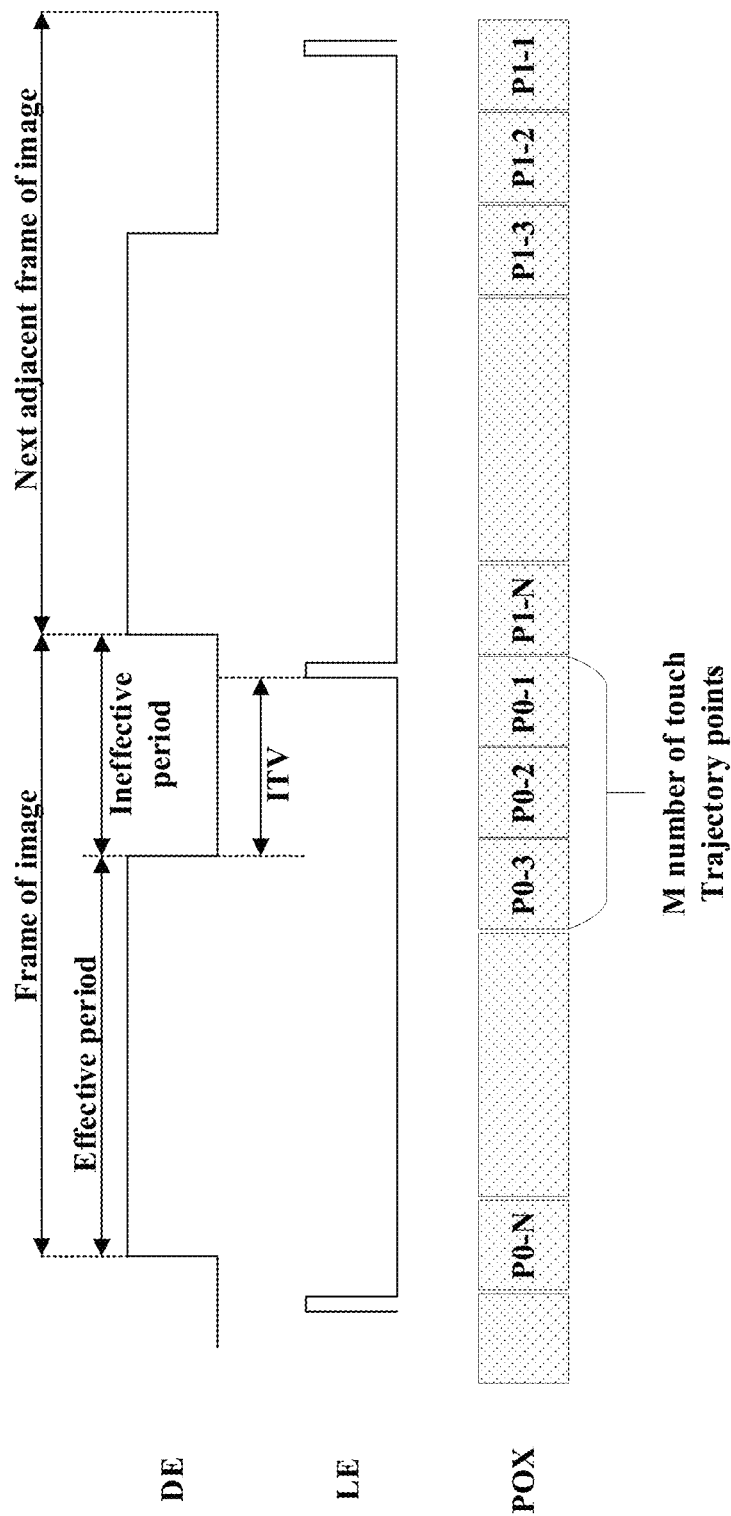
FIG. 2 illustrates a process of obtaining data of touch trajectory sequence information in some embodiments according to the present disclosure.

FIG. 2 illustrates a process of obtaining data of touch trajectory sequence information in some embodiments according to the present disclosure. Referring to FIG. 2, in some embodiments, the touch device is configured to transmit information of touch trajectory points to the first processor and the second processor per each frame of image, for example, frame-by-frame. FIG. 2 depicts a frame of image and a next adjacent frame of image. The frame of image includes an effective period and an ineffective period. In the frame of image, N number of touch trajectory points are transmitted (e.g., P0-1, P0-2, P0-3, . . . , P0-N), e.g., to the first processor or the second processor. In the next adjacent frame of image, N number of touch trajectory points are transmitted (e.g., P1-1, P1-2, P1-3, . . . , P1-N), e.g., to the first processor or the second processor.

In some embodiments, to obviate the issue of the delay in displaying user writing on the touch device, the field-programmable gate array is configured to receive M number of touch trajectory points per each frame of image. The M number of touch trajectory points are transmitted at least partially in the ineffective period of the frame of image to the field-programmable gate array. M is a positive integer ≥1, e.g., 2, 3, 4, 5, 6, 7, 8, 9, 10, 11, 12, 13, 14, 15, 16, 17, 18, 19, or 20, or an integer greater than 20. In FIG. 2, M=3.

In some embodiments, the M number of touch trajectory points are latched at least partially in an ineffective period between effective periods of a respective frame of image and a next adjacent frame of image. Optionally, the field-programmable gate array is configured to receive more than M number of touch trajectory points, however, only the M number of touch trajectory points are latched. Optionally, the M number of touch trajectory points latched may be greater than a number of touch trajectory points transmitted in one frame of image. For example, the M number of touch trajectory points latched may be a number of touch trajectory points transmitted in 2, 3, 4, or 5 frames of image. Optionally, the number of touch trajectory points latched depends on a duration needed for the first processor to render the data of the first touch trajectory image. Referring to FIG. 2, in some embodiments, the field-programmable gate array is further configured to generate a plurality of data enabling signals DE and a plurality of latching signals LE. Referring to FIG. 2, the touch position received from the touch device is denoted as "POX." An effective voltage level of a respective data enabling signal of the plurality of data enabling signals DE indicates the second processor is receiving touch trajectory points from the touch device, for example, row-by-row. Optionally, a respective latching signal of the plurality of latching signals is generated during the ineffective period and subsequent to a beginning time point of an ineffective voltage level of the respective data enabling signal by an interval ITV. A remaining sub-period of the ineffective period and subsequent to the interval ITV allows some time for the second processor to compute data based on the touch position information latched by the latching signal. Optionally, the second processor is configured to latch information of the M number of touch trajectory points upon generation of the respective latching signal.

Typically, an effective period of a respective frame of image (e.g., the frame of image or the next adjacent frame of image in FIG. 2) of the plurality of frames of image lasts approximately the time to scan the display panel row-by-row. For example, if the display panel includes 2160 data lines, the effective period of the respective frame of image lasts approximately the time to transmit data signals to 2160 data lines in the display panel. Typically, the ineffective period of the respective frame of image lasts about ⅕ or 1/10 of the effective period of the respective frame of image. In one example, the ineffective period lasts the time to transmit data signals to 90 data lines in the display panel. In one example, the interval ITV lasts the time to transmit data signals to 88 data lines in the display panel, so that the respective latching signal is generated prior to the next frame of image by a time to transmit data signals to 2 data lines. In this fashion, it ensures that the M number of touch trajectory points are latched prior to the next frame of image, and a third image data is generated based on the M number of touch trajectory points latched and a next frame of image in the first image data received by the field-programmable gate array.

In some embodiments, the second processor is configured to latch information of the M number of touch positions upon generation of the respective latching signal. The touch image generating module VID_DRAW is configured to generate the second image data of the second touch trajectory image based on the information of the M number of touch trajectory points and the trajectory parameters in the first touch trajectory sequence information, upon latching the information of the M number of touch positions.

The first processor is configured to transmit the first image data to the second processor. The second processor (e.g., the image receiving module VBO_RX in FIG. 1) is configured to receive the first image data from the solution-on-chip. The inventors of the present disclosure discover that, in related display apparatus, a delay exists in displaying the first touch trajectory image (e.g., delay at least partially due to rendering of the first image data by the solution-on-chip). The inventors of the present disclosure discover that, surprisingly and unexpectedly, the structure and/or algorithm of the present disclosure can effectively reduce or eliminate the delay. In some embodiments, the M number of touch trajectory points are the most recently obtained touch trajectory points. The second processor is configured to generate a second image data of a second touch trajectory image based on the M number of touch trajectory points; and generate a third image data based on the first image data and at least a portion of the second image data. By generating the third image data based on the second image data and the first image data, a visual effect can be presented to a user in which a touch trajectory image with little or no delay is displayed.

In some embodiments, the first processor (e.g., the solution-on-chip) is coupled to the touch device, and is further configured to determine whether the touch occurs, and transmit a result of determination to the second processor (e.g., the field-programmable gate array). The second processor is configured to generate a third image data based on the first image data and at least a portion of the second touch trajectory sequence information, upon receiving the result of determination. Optionally, the first processor is further configured to transmit at least trajectory parameters in the data of the first touch trajectory image to the second processor upon determination the touch occurs. Referring to FIG. 1, the solution-on-chip SOC is configured to transmit the result of determination (e.g., a touch mode or a non-touch mode) to the command detection module COM_DET in the field-programmable gate array FPGA through an IIC bus line. The trajectory parameters information transmitted from the solution-on-chip SOC to the field-programmable gate array FPGA includes at least one of a color, a line width, or a writing style in the first touch trajectory image.

Because the third image data generated based on the second image data and the first image data by the field-programmable gate array FPGA functions to temporarily reduce delay. The third image data eventually will be overlayed by another frame of image in the first image data rendered by the solution-on-chip SOC. For example, a present frame of image in the third image data will be overlayed by a next frame of image in the first image data, because the second touch trajectory points corresponding to the present frame of image in the third image data are a subset of the first touch trajectory points in the next frame of image in the first image data.

In some embodiments, the trajectory parameters information transmitted from the solution-on-chip SOC to the field-programmable gate array FPGA need not to be exactly the same as those in the first touch trajectory image. In one example, the trajectory parameters of a color transmitted from the solution-on-chip SOC to the field-programmable gate array FPGA is the same as that in the first touch trajectory image. However, the trajectory parameters of a line width, or a writing style, may be different from those in the first touch trajectory image.

In some embodiments, the second processor is coupled to the touch device, and is further configured to receive and parse information of at least the M number of touch trajectory points received from the touch device. Referring to FIG. 1, in one example, the serial receiver module UART_RX in the field-programmable gate array FPGA is configured to parse information of touch trajectory points received from the touch device TP.

In some embodiments, the second processor is configured to generate the second image data of the second touch trajectory image based on information of the M number of touch trajectory points and the trajectory parameters in the first touch trajectory sequence information. The trajectory parameters in the first touch trajectory sequence information includes at least one of a color, a line width, or a writing style in the first touch trajectory image.

Figure 3A:
FIG. 3A illustrates a first touch trajectory in some embodiments according to the present disclosure.

FIG. 3A illustrates a first touch trajectory image in some embodiments according to the present disclosure. Referring to FIG. 3A, a user uses the touch control panel to write "BOE". Due to the delay discussed above, at time point t1, only the solidly filled part of the word is displayed, and the part circled by dotted line is displayed at time point t2, wherein t2=(t1+Δt). The delay is particularly visually noticeable when the user writes on the touch control panel with an enhanced speed. In one example, the time point t1 is a time point when the physical touch action of writing "BOE" is complete, and the time point t2 is a time point when the last stroke of "BOE" are displayed. FIG. 3A illustrates the delay at time point t1. However, the delay may occur at any time point when the touch is ongoing. The delay adversely affects the user experience.

Figure 3B:
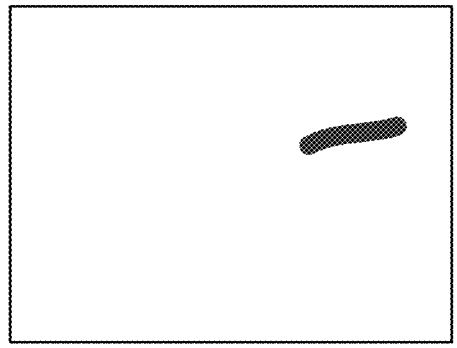
FIG. 3B illustrates a second touch trajectory in some embodiments according to the present disclosure.

FIG. 3B illustrates a second touch trajectory image in some embodiments according to the present disclosure. Referring to FIG. 3B, the second touch trajectory image embodies the last stroke of "BOE" at the time point t1.

Figure 3C:
FIG. 3C illustrates a superimposed touch trajectory in some embodiments according to the present disclosure.

FIG. 3C illustrates a superimposed touch trajectory image in some embodiments according to the present disclosure. Referring to FIG. 3C, the superimposed touch trajectory image displays a complete "BOE" at the time point t1. Accordingly, the delay in displaying the first touch trajectory image can be reduced.

Figure 4:
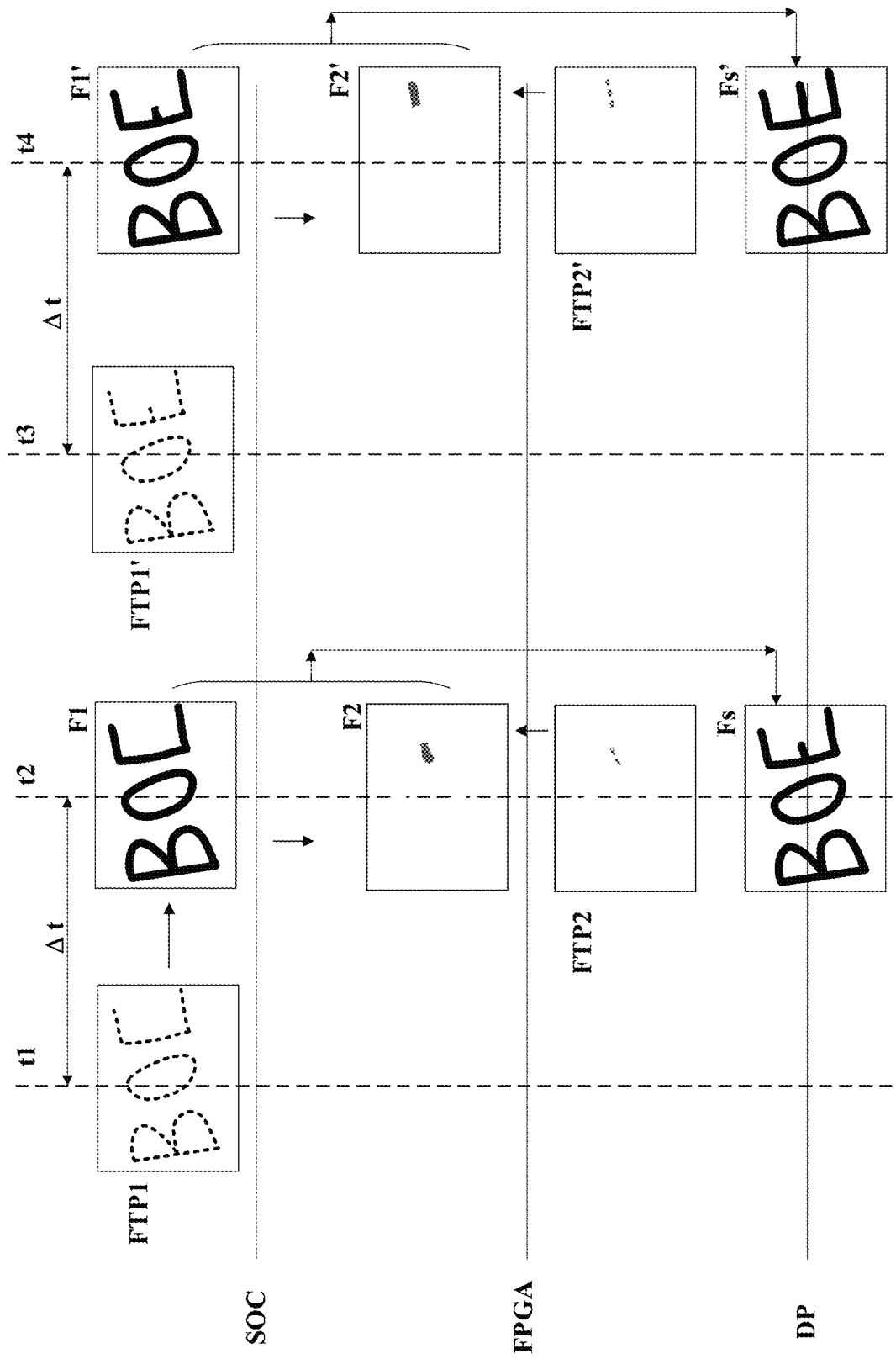
FIG. 4 illustrates a process of generating a third image data based on a respective frame of image in the first image data and a respective frame of image in the second image data in some embodiments according to the present disclosure.

In some embodiments, the first image data includes a plurality of first frames of image, and the second image data includes a plurality of second frames of image. The plurality of first frames of image correspond to the plurality of second frames of image, respectively, and a respective frame of image in the first image data corresponds to a respective frame of image in the second image data. Optionally, at least a portion of second touch trajectory points for forming the respective frame of image in the second image data are obtained by the touch device later in time than first touch trajectory points for forming the respective frame of image in the first image data. FIG. 4 illustrates a process of generating a third image data based on a respective frame of image in the first image data and a respective frame of image in the second image data in some embodiments according to the present disclosure. Referring to FIG. 4, first touch trajectory points FTP1 for forming a respective frame of image F1 in the first image data is obtained at a time point t1. Due to the delay in rendering of the first image data by the solution-on-chip SOC, the respective frame of image F1 in the first image data is rendered at a time point t2, wherein t2=(t1+Δt). The respective frame of image F1 in the first image data is transmitted from the solution-on-chip SOC to the field-programmable gate array FPGA at the time point t2. Typically, there is also some delay in transmitting the first image data from the first processor to the second processor. The transmission delay, however, is relatively much shorter than the delay in rendering of the first image data, thus it is not shown in FIG. 4. Second touch trajectory points FTP2 for forming a respective frame of image F2 in the second image data is obtained at the time point t2. A third image data Fs is generated based on the respective frame of image F1 in the first image data and the respective frame of image F2 in the second image data. As shown in FIG. 4, the second touch trajectory points FTP2 for forming the respective frame of image F2 in the second image data are obtained (at the time point t2) later in time than the first touch trajectory points FTP1 (obtained at the time point t1) for forming the respective frame of image F1 in the first image data.

Similarly, with respect to a next frame of image, first touch trajectory points FTP1' for forming a respective next frame of image F1' in the first image data is obtained at a time point t3. Due to the delay in rendering of the first image data by the solution-on-chip SOC, the respective next frame of image F1' in the first image data is rendered at a time point t4, wherein t4=(t3+Δt). The respective next frame of image F1' in the first image data is transmitted from the solution-on-chip SOC to the field-programmable gate array FPGA at the time point t4. Second touch trajectory points FTP2' for forming a respective next frame of image F2' in the second image data is obtained at the time point t4. A third image data Fs' is generated based on the respective next frame of image F1' in the first image data and the respective next frame of image F2' in the second image data. As shown in FIG. 4, the second touch trajectory points FTP2' for forming the respective next frame of image F2' in the second image data are obtained (at the time point t4) later in time than the first touch trajectory points FTP1' (obtained at the time point t3) for forming the respective next frame of image F1' in the first image data. In one example (in most scenarios), with respect to two adjacent frames of image, the time point t3 is earlier in time than the time point t2.

With respect to the respective frame of image F1 in the first image data and the respective frame of image F2 in the second image data corresponding to each other, the first touch trajectory points FTP1 for forming the respective frame of image F1 in the first image data and the second touch trajectory points FTP2 for forming the respective frame of image F2 in the second image data may or may not have touch trajectory point in common. In one example as depicted in FIG. 4, the first touch trajectory points for forming the respective frame of image in the first image data and the second touch trajectory points for forming the respective frame of image in the second image data have no touch trajectory point in common. In another example (in most scenarios), the first touch trajectory points for forming the respective frame of image in the first image data and the second touch trajectory points for forming the respective frame of image in the second image data have at least one touch trajectory point in common.

In some embodiments, the touch device time-sequentially transmits information of touch trajectory points to the first processor (e.g., the solution-on-chip SOC) and the second processor (e.g., the field-programmable gate array FPGA), for example, frame-by-frame. Optionally, the touch device transmits the first touch trajectory points FTP1 for forming the respective frame of image F1 in the first image data to the first processor; and transmits the second touch trajectory points FTP2 for forming the respective frame of image F2 in the second image data to the second processor, the respective frame of image F1 in the first image data corresponding to the respective frame of image F2 in the second image data.

Prior to transmitting the respective frame of image F1 in the first image data to the second processor, the first processor takes time to render the first image data (e.g., the delay Δt discussed above). By the time the respective frame of image F1 in the first image data is transmitted from the first processor to the second processor, the second processor generates the respective frame of image F2 in the second image data based on the second touch trajectory points FTP2 for forming the respective frame of image F2 in the second image data. The second touch trajectory points FTP2 for forming the respective frame of image F2 in the second image data are obtained by touch device (e.g., at the time point t2) later in time than the first touch trajectory points FTP1 (e.g., at the time point t1) for forming the respective frame of image F1 in the first image data.

In some embodiments, the first touch trajectory sequence information transmitted to the first processor and the second touch trajectory sequence information transmitted to the second processor are substantially the same. The second processor is configured to generate the respective frame of image F2 in the second image data based on most recently obtained M number of touch trajectory points in the second touch trajectory sequence information. When the first touch trajectory sequence information transmitted to the first processor and the second touch trajectory sequence information transmitted to the second processor are substantially the same, they are used for different frames of image. For example, the first touch trajectory sequence information transmitted to the first processor and the second touch trajectory sequence information transmitted to the second processor are substantially the same, and are obtained at the time point t2. The most recently obtained M number of touch trajectory points in the second touch trajectory sequence information obtained at the time point t2 is used for generating a second image data that is used with a first image data comprising the data of a first touch trajectory image to generate the third image data, wherein the data of the first touch trajectory image is generated based on first touch trajectory sequence information obtained not at the time point t2, but at the time point t1.

In some embodiments, the first touch trajectory sequence information transmitted to the first processor and the second touch trajectory sequence information transmitted to the second processor are different from each other. The touch device is configured to transmit the first touch trajectory points FTP1 to the first processor, frame-by-frame. In one example, with respect to the respective frame of image F1 in the first image data, the touch device is configured to transmit N number of touch trajectory points to the first processor. With respect to the respective frame of image F2 in the second image data corresponding to the respective frame of image F1 in the first image data, the touch device is configured to transmit M number of touch trajectory points to the second processor, M and N being positive integers, N>M. In one example, the M number of touch trajectory points corresponds to most recently obtained touch trajectory points among the N number of touch trajectory points. The N number of touch trajectory points transmitted to the first processor and the M number of touch trajectory points transmitted to the second processor that are transmitted at the same time are used for different frames of image. For example, the N number of touch trajectory points transmitted to the first processor and the M number of touch trajectory points transmitted to the second processor that are transmitted at the same time, are obtained at the time point t2. The M number of touch trajectory points in the second touch trajectory sequence information obtained at the time point t2 is used for generating a second image data that is used with a first image data comprising the data of a first touch trajectory image to generate the third image data, wherein the data of the first touch trajectory image is generated based on the N number of touch trajectory points obtained not at the time point t2, but at the time point t1.

In some embodiments, the display panel has a resolution different from a resolution of the touch device. In some embodiments, the second processor is further configured to convert coordinate information in a first coordinate system in the touch device into coordinate information in a second coordinate system in the display panel. For example, the position mapping module POX_MAP in FIG. 1 is configured to convert coordinate information in the first coordinate system in the touch device into coordinate information in the second coordinate system in the display panel. In one example, the display panel has a resolution of 3840*2160, whereas the touch device has a resolution of 224*112. A touch position may be expressed as (a, b), and the corresponding position in the display panel may be expressed as (x, y). The conversion may be expressed as x=a*3840/224; y=b*2160/112. Optionally, the field-programmable gate array FPGA is configured to generate the third image data according to the second coordinate system. For example, the third image data is generated so that at least a portion of a user's writing on the touch panel is mapped to a user's writing image displayed on the display panel, subject to image rendering based on trajectory parameters.

In some embodiments, the second processor is further configured to perform pixel compensation on the third image data to generate a compensated image data. In one example, the subpixel compensation module PIX_COM in FIG. 1 is configured to perform pixel compensation on the third image data.

In some embodiments, the back light unit comprises a plurality of independently controllable back light portions. Optionally, the second processor is further configured to generate a plurality of back light portion driving parameters for the plurality of independently controllable back light portions, respectively, based on the third image data, a respective driving parameter of the plurality of back light portion driving parameters being used for drive light emission of a respective back light portion of the plurality of independently controllable back light portions. Optionally, the second processor is further configured to perform pixel compensation on the third image data based on the plurality of back light portion driving parameters to generate a compensated image data; and transmit the compensated image data to the display panel. The display panel is configured to display an image based on the compensated image data. By having this implementation, the power consumption of the display panel can be reduced, and contrast level of the display panel can be enhanced.

In some embodiments, the second processor is further configured to transmit the compensated image data to the display panel. In one example, the image transmitting module VBO_TX in FIG. 1 is configured to transmit the compensated image data to the display panel. The display panel is configured to display an image based on the compensated image data, upon receiving the compensated image data.

Figure 5:
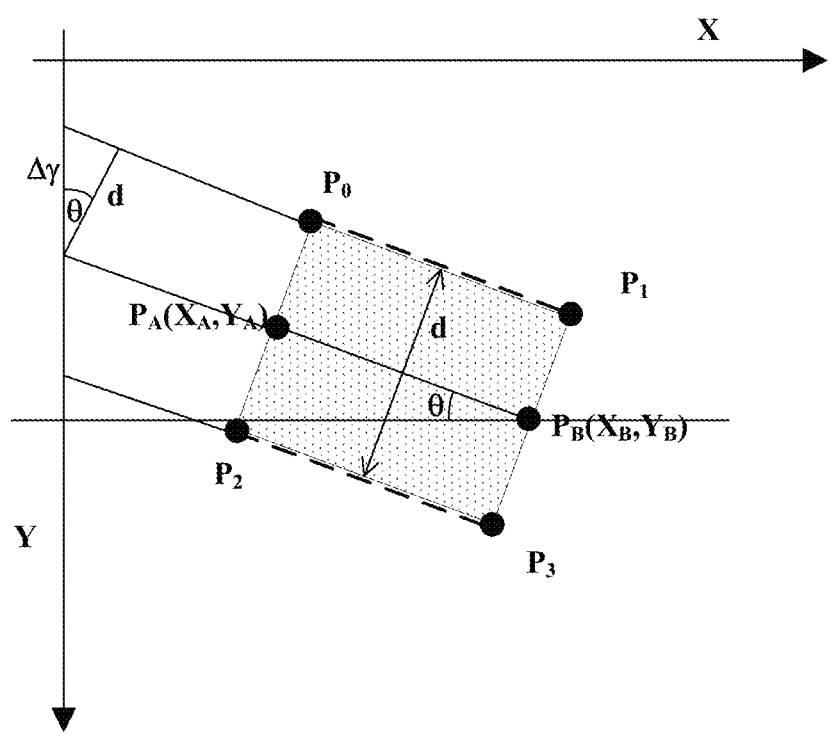
FIG. 5 illustrates a process of determining positional information of a second touch trajectory image of the M number of touch positions based on the information of the M number of touch positions and a line width in the image of the touch in some embodiments according to the present disclosure.

FIG. 5 illustrates a process of determining positional information of a second touch trajectory image of the M number of touch positions based on the information of the M number of touch positions and a line width in the image of the touch in some embodiments according to the present disclosure. Referring to FIG. 5, information of two touch positions PA and PB are latched. The touch position PA has a coordinate (XA, YA), and the touch position PB has a coordinate (XB, YB). The line width in the image of the touch is d. The shaded area in FIG. 5 (e.g., the area surrounded by $P_0$, $P_1$, $P_2$, and $P_3$) indicates an area corresponding to the image of M number of touch positions.

In some embodiments, the line PA-PB may be expressed as y=k*x+b. Optionally, k=(YB−YA)/(XB−XA); b=YA/(k×XA). Optionally, tan θ=k. Optionally, cos θ=d/Δγ. Accordingly, Δγ=d/cos θ, wherein θ=arctan (k).

In some embodiments, the line $P_0$-$P_1$ may be expressed as y=k*x+b+Δγ. Optionally, k=(YB−YA)/(XB−XA); b=YB/(k*XA). Optionally, Δγ=d/cos θ, wherein θ=arctan (k).

In some embodiments, the line $P_2$-$P_3$ may be expressed as y=k*x+b−Δγ. Optionally, k=(YB−YA)/(XB−XA); b=YB−(k*XA). Optionally, Δγ=d/cos θ, wherein θ=arctan (k).

In some embodiments, the line $P_0$-$P_2$ is perpendicular to the line PA-PB. The line $P_0$-$P_2$ may be expressed as y=k1*x+b1, wherein k1=−1/k; b1=YA−(k1*XA).

In some embodiments, the line $P_1$-$P_3$ is perpendicular to the line PA-PB. The line $P_1$-$P_3$ may be expressed as y=k2*x+b2, wherein k2=−1/k; b2=YB−(k1*XB).

In some embodiments, the trajectory of the M number of touch positions may be defined by the line $P_0$-$P_1$, the line $P_2$-$P_3$, the line $P_0$-$P_2$, and the line $P_1$-$P_3$. The process illustrated in FIG. 5 is an exemplary implementation of the present disclosure. Various appropriate implementations of trajectory calculation may be practiced.

Figure 6A:
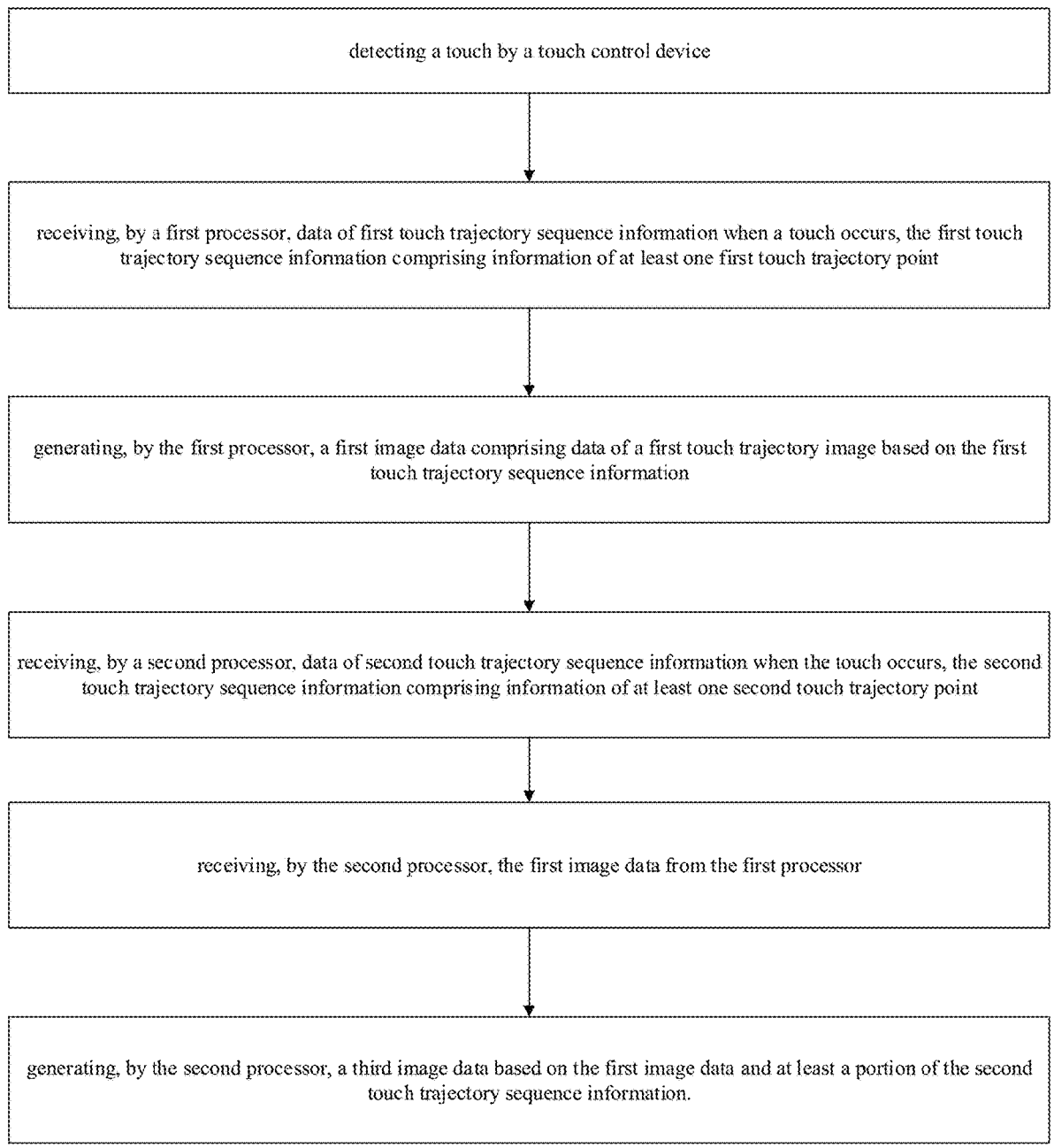
FIG. 6A is a flow chart illustrating a display method in some embodiments according to the present disclosure.

In another aspect, the present disclosure provides a display method. FIG. 6A is a flow chart illustrating a display method in some embodiments according to the present disclosure. Referring to FIG. 6A, the display method in some embodiments includes detecting a touch by a touch device; receiving, by a first processor, data of first touch trajectory sequence information when a touch occurs, the first touch trajectory sequence information comprising information of at least one first touch trajectory point; generating, by the first processor, a first image data comprising data of a first touch trajectory image, wherein the data of the first touch trajectory image is generated based on the first touch trajectory sequence information; receiving, by a second processor, data of second touch trajectory sequence information when the touch occurs, the second touch trajectory sequence information comprising information of at least one second touch trajectory point; receiving, by the second processor, the first image data from the first processor and generating, by the second processor, a third image data based on the first image data and at least a portion of the second touch trajectory sequence information.

FIG. 6B is a flow chart illustrating a display method in some embodiments according to the present disclosure. In some embodiments, referring to FIG. 6B, the display method further includes generating, by the second processor, a second image data of a second touch trajectory image based on the second touch trajectory sequence information; and generating, by the second processor, the third image data based on the first image data and the second image data.

FIG. 6C is a flow chart illustrating a display method in some embodiments according to the present disclosure. In some embodiments, referring to FIG. 6C, the display method further includes modifying, by the second processor, the first image data based on the at least a portion of the second touch trajectory sequence information, thereby generating the third image data.

In some embodiments, a respective frame of image in the first image data corresponds to a respective frame of image in the second image data. Optionally, at least a portion of second touch trajectory points for forming the respective frame of image in the second image data are obtained by the touch device later in time than first touch trajectory points for forming the respective frame of image in the first image data.

Figure 7:
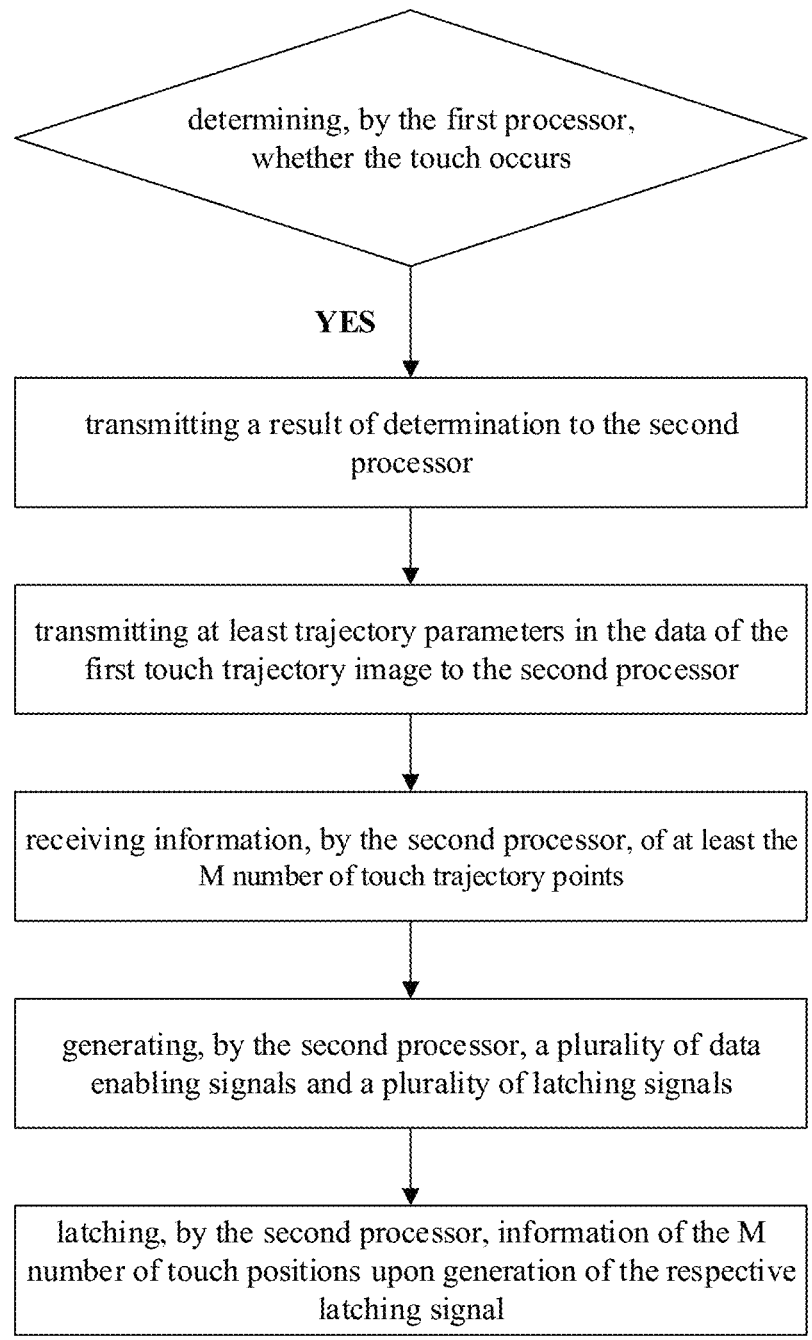
FIG. 7 is a flow chart illustrating a display method in some embodiments according to the present disclosure.

FIG. 7 is a flow chart illustrating a display method in some embodiments according to the present disclosure. Referring to FIG. 7, the display method in some embodiments includes determining, by the first processor, whether the touch occurs (e.g., during the frame of image). The display method further includes transmitting a result of determination to the second processor, and transmitting at least trajectory parameters in the data of the first touch trajectory image to the second processor, upon determination the touch occurs (e.g., during the frame of image).

Referring to FIG. 7, the display method in some embodiments further includes receiving information, by the second processor, of at least M number of touch trajectory points. Optionally, the M number of touch trajectory points are latched at least partially in an ineffective period between effective periods of a respective frame of image and a next adjacent frame of image.

In some embodiments, the display method in some embodiments further includes generating, by the second processor, a plurality of data enabling signals and a plurality of latching signals. In some embodiments, an effective voltage level of a respective data enabling signal of the plurality of data enabling signals indicates the second processor is receiving touch trajectory points row-by-row from the touch device. In some embodiments, the ineffective period is between effective periods respectively of two adjacent data enabling signals of the plurality of data enabling signals. Optionally, the second processor is configured to receive the first image data during the effective periods. Optionally, the two adjacent data enabling signals includes a present data enabling signal corresponding to the frame of image and a next adjacent data enabling signal corresponding to the next adjacent frame of image. A respective latching signal of the plurality of latching signals is generated during the ineffective period and subsequent to a beginning time point of an ineffective voltage level of the respective data enabling signal by an interval. Referring to FIG. 7, the display method in some embodiments further includes latching, by the second processor, information of the M number of touch trajectory points upon generation of the respective latching signal.

FIG. 8 is a flow chart illustrating a display method in some embodiments according to the present disclosure. Referring to FIG. 8, the display method in some embodiments further includes generating, by the second processor, the second image data of the second touch trajectory image based on information of the M number of touch trajectory points and the trajectory parameters in the first touch trajectory sequence information; and generating the third image data based on the second image data of the second touch trajectory image and the first image data comprising the data of the first touch trajectory image.

In some embodiments, the second processor is coupled to a back light unit and a display panel. Optionally, the back light unit comprises a plurality of independently controllable back light portions. Optionally, the display method further includes generating, by the second processor, a plurality of back light portion driving parameters for the plurality of independently controllable back light portions, respectively, based on the third image data, wherein a respective driving parameter of the plurality of back light portion driving parameters is used for drive light emission of a respective back light portion of the plurality of independently controllable back light portions; performing, by the second processor, pixel compensation on the third image data based on the plurality of back light portion driving parameters to generate a compensated image data; transmitting, by the second processor, the compensated image data to a display panel; and displaying, by the display panel, an image based on the compensated image data.

In another aspect, the present disclosure provides a computer-program product comprising a non-transitory tangible computer-readable medium having computer-readable instructions thereon. In some embodiments, the computer-readable instructions are executable by a processor to cause the processor to perform causing a first processor to receive data of first touch trajectory sequence information when a touch occurs, the first touch trajectory sequence information comprising information of at least one first touch trajectory point; causing the first processor to generate a first image data comprising data of a first touch trajectory image, wherein the data of the first touch trajectory image is generated based on the first touch trajectory sequence information; causing a second processor to receive data of second touch trajectory sequence information when the touch occurs, the second touch trajectory sequence information comprising information of at least one second touch trajectory point; causing the second processor to receive the first image data from the first processor; and causing the second processor to generate a third image data based on the first image data and at least a portion of the second touch trajectory sequence information.

In some embodiments, the computer-readable instructions are executable by a processor to cause the processor to further perform causing the second processor to generate a second image data of a second touch trajectory image based on the second touch trajectory sequence information; receive the first image data from the first processor; and generate the third data based on the first image data and the second image data.

In some embodiments, the computer-readable instructions are executable by a processor to cause the processor to further perform causing the second processor to receive the first image data from the first processor; and modify the first image data based on the at least a portion of the second touch trajectory sequence information, thereby generating the third image data.

In some embodiments, a respective frame of image in the first image data corresponds to a respective frame of image in the second image data. Optionally, at least a portion of second touch trajectory points for forming the respective frame of image in the second image data are obtained by the touch device later in time than first touch trajectory points for forming the respective frame of image in the first image data.

In some embodiments, the computer-readable instructions are executable by a processor to cause the processor to further perform causing the first processor coupled to the touch device to determine whether the touch occurs, transmit a result of determination to the second processor, and transmit at least trajectory parameters in the data of the first touch trajectory image to the second processor upon determination the touch occurs. Optionally, the trajectory parameters include at least one of a color, a line width, or a writing style in the first touch trajectory image.

In some embodiments, the computer-readable instructions are executable by a processor to cause the processor to further perform causing the second processor coupled to the touch device to receive and parse information of at least M number of touch trajectory points.

In some embodiments, the computer-readable instructions are executable by a processor to cause the processor to further perform causing the second processor to generate the second image data of the second touch trajectory image based on information of the M number of touch trajectory points and the trajectory parameters in the first touch trajectory sequence information. Optionally, the M number of touch trajectory points are latched at least partially in an ineffective period between effective periods of a respective frame of image and a next adjacent frame of image.

In some embodiments, the computer-readable instructions are executable by a processor to cause the processor to further perform causing the second processor to generate a plurality of data enabling signals and a plurality of latching signals. Optionally an effective voltage level of a respective data enabling signal of the plurality of data enabling signals indicates the second processor is receiving touch trajectory points row-by-row from the touch device. A respective latching signal of the plurality of latching signals is generated during the ineffective period and subsequent to a beginning time point of an ineffective voltage level of the respective data enabling signal by an interval. Optionally, the computer-readable instructions are executable by a processor to cause the processor to further perform causing the second processor to latch information of the M number of touch trajectory points upon generation of the respective latching signal.

In some embodiments, the second processor is coupled to a back light unit and a display panel. Optionally, the back light unit comprises a plurality of independently controllable back light portions. Optionally, the computer-readable instructions are executable by a processor to cause the second processor to generate a plurality of back light portion driving parameters for the plurality of independently controllable back light portions, respectively, based on the third image data. Optionally, a respective driving parameter of the plurality of back light portion driving parameters is used for drive light emission of a respective back light portion of the plurality of independently controllable back light portions. Optionally, the computer-readable instructions are executable by a processor to cause the second processor to perform pixel compensation on the third image data based on the plurality of back light portion driving parameters to generate a compensated image data, and transmit the compensated image data to a display panel. Optionally, the computer-readable instructions are executable by a processor to cause the display panel to display an image based on the compensated image data.

In some embodiments, the computer-readable instructions are executable by a processor to cause the second processor to convert coordinate information in a first coordinate system in the touch device into coordinate information in a second coordinate system in a display panel. Optionally, the computer-readable instructions are executable by a processor to cause the second processor to generate the third image data according to the second coordinate system Various illustrative operations described in connection with the configurations disclosed herein may be implemented as electronic hardware, computer software, or combinations of both. Such operations may be implemented or performed with a general purpose processor, a digital signal processor (DSP), an ASIC or ASSP, an FPGA or other programmable logic device, discrete gate or transistor logic, discrete hardware components, or any combination thereof designed to produce the configuration as disclosed herein. For example, such a configuration may be implemented at least in part as a hard-wired circuit, as a circuit configuration fabricated into an application-specific integrated circuit, or as a firmware program loaded into non-volatile storage or a software program loaded from or into a data storage medium as machine-readable code, such code being instructions executable by an array of logic elements such as a general purpose processor or other digital signal processing unit. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. A software module may reside in a non-transitory storage medium such as RAM (random-access memory), ROM (read-only memory), nonvolatile RAM (NVRAM) such as flash RAM, erasable programmable ROM (EPROM), electrically erasable programmable ROM (EEPROM), registers, hard disk, a removable disk, or a CD-ROM; or in any other form of storage medium known in the art. An illustrative storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A display apparatus, comprising:
    a touch device configured to detect a touch;
    a first processor configured to:
    receive data of first touch trajectory sequence information when a touch occurs, the first touch trajectory sequence information comprising information of at least one first touch trajectory point; and
    generate a first image data comprising data of a first touch trajectory image, wherein the data of the first touch trajectory image is generated based on the first touch trajectory sequence information;
    and
    a second processor configured to:
    receive data of second touch trajectory sequence information when the touch occurs, the second touch trajectory sequence information comprising information of at least one second touch trajectory point;
    receive the first image data from the first processor; and
    generate a third image data based on the first image data and at least a portion of the second touch trajectory sequence information.

2. The display apparatus of claim 1, wherein the second processor is further configured to:
    generate a second image data of a second touch trajectory image based on the second touch trajectory sequence information; and
    generate the third image data based on the first image data and the second image data.

3. The display apparatus of claim 2, wherein a respective frame of image in the first image data corresponds to a respective frame of image in the second image data; and
    at least a portion of second touch trajectory points for forming the respective frame of image in the second image data are obtained by the touch device later in time than first touch trajectory points for forming the respective frame of image in the first image data.

4. The display apparatus of claim 1, wherein the first processor is coupled to the touch device, and is further configured to determine whether the touch occurs, and transmit a result of determination to the second processor when the touch occurs; and
    the second processor is configured to generate the third image data when the touch occurs.

5. The display apparatus of claim 2, wherein the first processor further configured to transmit at least trajectory parameters in the data of the first touch trajectory image to the second processor; and
    the second processor is configured to generate the second image data of the second touch trajectory image based on trajectory parameters.

6. The display apparatus of claim 5, wherein the trajectory parameters include at least one of a color, a line width, or a writing style.

7. The display apparatus of claim 2, wherein the second processor is further configured to receive information of at least M number of touch trajectory points, the second touch trajectory sequence information comprising information of the M number of touch trajectory points; and
    the second processor is configured to generate the second image data of the second touch trajectory image based on information of the M number of touch trajectory points.

8. The display apparatus of claim 2, wherein M number of touch trajectory points are latched at least partially in an ineffective period between effective periods of a respective frame of image and a next adjacent frame of image, the second touch trajectory sequence information comprising information of the M number of touch trajectory points; and
    the second processor is configured to receive the first image data during the effective periods;
    the second processor is configured to generate the second image data of the second touch trajectory image based on information of the M number of touch trajectory points.

9. The display apparatus of claim 8, wherein the second processor is further configured to generate a plurality of data enabling signals and a plurality of latching signals;
    an effective voltage level of a respective data enabling signal of the plurality of data enabling signals indicates the second processor is receiving the first image data from first processor;
    a respective latching signal of the plurality of latching signals is generated during the ineffective period and subsequent to a beginning time point of an ineffective voltage level of the respective data enabling signal by an interval; and
    the second processor is configured to latch information of the M number of touch trajectory points upon generation of the respective latching signal.

10. The display apparatus of claim 1, further comprising a display panel having a resolution different from a resolution of the touch device;
    wherein the second processor is further configured to convert coordinate information in a first coordinate system in the touch device into coordinate information in a second coordinate system in the display panel; and
generate the third image data according to coordinate information in a second coordinate system in the display panel.

11. The display apparatus of claim 1, further comprising a display panel and a back light unit;
wherein the back light unit comprises a plurality of independently controllable back light portions;
the second processor is further configured to:
based on the third image data, generate a plurality of back light portion driving parameters for the plurality of independently controllable back light portions, respectively, wherein a respective driving parameter of the plurality of back light portion driving parameters is used for drive light emission of a respective back light portion of the plurality of independently controllable back light portions;
perform pixel compensation on the third image data based on the plurality of back light portion driving parameters to generate a compensated image data; and
transmit the compensated image data to the display panel;
wherein the display panel is configured to display an image based on the compensated image data.

12. The display apparatus of claim 1, wherein the second processor is coupled to the touch device.

13. The display apparatus of claim 1, wherein the second processor is coupled to the first processor; and
the first processor is configured to receive the data of first touch trajectory sequence information when a touch occurs from the touch device, and is configured to transmit the data of second touch trajectory sequence information to the second processor.

14. The display apparatus of claim 1, wherein the first processor is a solution-on-chip, and the second processor is a field-programmable gate array.

15. A display method, comprising:
detecting a touch by a touch device;
receiving, by a first processor, data of first touch trajectory sequence information when a touch occurs, the first touch trajectory sequence information comprising information of at least one first touch trajectory point;
generating, by the first processor, a first image data comprising data of a first touch trajectory image, wherein the data of the first touch trajectory image is generated based on the first touch trajectory sequence information;
receiving, by a second processor, data of second touch trajectory sequence information when the touch occurs, the second touch trajectory sequence information comprising information of at least one second touch trajectory point;
receiving, by the second processor, the first image data from the first processor; and
generating, by the second processor, a third image data based on the first image data and at least a portion of the second touch trajectory sequence information.

16. The display method of claim 15, further comprising:
generating, by the second processor, a second image data of a second touch trajectory image based on the second touch trajectory sequence information; and
generating, by the second processor, the third image data based on the first image data and the second image data.

17. The display method of claim 16, wherein a respective frame of image in the first image data corresponds to a respective frame of image in the second image data; and
at least a portion of second touch trajectory points for forming the respective frame of image in the second image data are obtained by the touch device later in time than first touch trajectory points for forming the respective frame of image in the first image data.

18. The display method of claim 15, further comprising:
determining, by the first processor, whether the touch occurs;
transmitting a result of determination to the second processor when the touch occurs; and
generating, by the second processor, the third image data when the touch occurs.

19. The display method of claim 16, further comprising:
transmitting, by the first processor, at least trajectory parameters in the data of the first touch trajectory image to the second processor; and
generating, by the second processor, the second image data of the second touch trajectory image based on trajectory parameters.

20. A computer-program product comprising a non-transitory tangible computer-readable medium having computer-readable instructions thereon, the computer-readable instructions being executable by a processor to cause the processor to perform:
causing a first processor to receive data of first touch trajectory sequence information when a touch occurs, the first touch trajectory sequence information comprising information of at least one first touch trajectory point;
causing the first processor to generate a first image data comprising data of a first touch trajectory image, wherein the data of the first touch trajectory image is generated based on the first touch trajectory sequence information;
causing a second processor to receive data of second touch trajectory sequence information when the touch occurs, the second touch trajectory sequence information comprising information of at least one second touch trajectory point;
causing the second processor to receive the first image data from the first processor; and
causing the second processor to generate a third image data based on the first image data and at least a portion of the second touch trajectory sequence information.

* * * * *